Aug. 2, 1938.   F. T. REED   2,125,810
PLUG VALVE
Filed Feb. 15, 1937
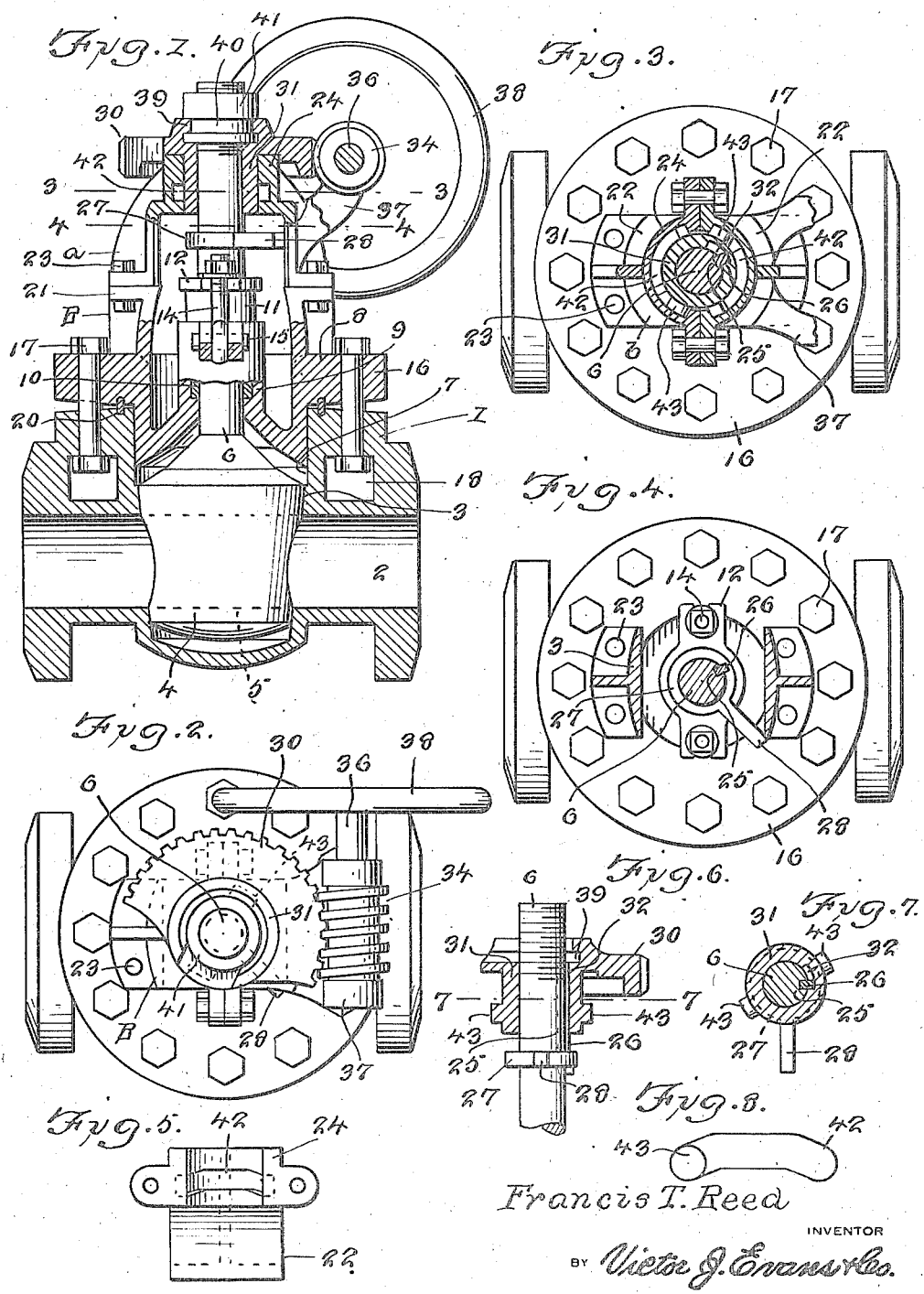
Francis T. Reed
INVENTOR
BY Victor J. Evans & Co.
ATTORNEYS Patented Aug. 2, 1938

2,125,810

UNITED STATES PATENT OFFICE 2,125,810

PLUG VALVE

Francis T. Reed, New Orleans, La.

Application February 15, 1937, Serial No. 125,853

2 Claims. (Cl. 251—97)

This invention relates to valves of the type set forth in the United States Letters Patent No. 1,894,196 and has for the primary object the provision of a device of this character which is operated in a manner similar to the operation of the patented valve above referred to, with means for bringing about endwise movement of the valve element both before and during the final rotation thereof, during either the opening or closing of the valve to assure quick and easy unseating of the valve element and the positive seating thereof to prevent leaking about said valve element and its seat when the valve is opened or closed.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a vertical sectional view illustrating a valve constructed in accordance with my invention.

Figure 2 is a top plan view illustrating the same.

Figure 3 is a sectional view taken on the line 3—3 of Figure 1.

Figure 4 is a sectional view taken on the line 4—4 of Figure 1.

Figure 5 is a detail plan view illustrating one of the bearing elements of the bonnet of the valve and showing the cam groove thereof.

Figure 6 is a fragmentary vertical sectional view showing the connection between the gear and the stem of the valve element.

Figure 7 is a sectional view taken on the line 7—7 of Figure 6.

Figure 8 is a diagrammatical view illustrating one of the cam grooves.

Referring in detail to the drawing, the numeral 1 indicates the body of the valve provided with ports 2 and a tapered seat 3 to receive a plug type valve element 4. The taper of the valve element matches the taper of the seat 3 and the valve element has a passage 5 to be moved into and out of register with the ports 2 by the rotation of the valve element.

The stem of the valve element is indicated by the character 6 and extends outwardly of the body by way of an opening 7 which opening receives a bonnet 8. The bonnet 8 includes a sleeve 9 through which the stem 6 extends. A packing 10 is arranged in the sleeve 9 to contact the stem 6 and is forced in engagement therewith by a bushing 11 received in the sleeve 9. The bushing 11 has integral therewith oppositely extending apertured ears 12 which receive tie bolts 14 pivoted to the sleeve 9, as shown at 15. Nuts and washers are adapted to the tie bolts providing means for adjusting the bushing relative to the sleeve 9 for tightening the packing 10 against the stem 6.

The bonnet 8 has a flange 16 apertured to receive stud bolts 17. The stud bolts extend into openings provided in the body flange of the valve and said body is also apertured, as shown at 18, to permit nuts to be applied to the stud bolts. A gasket 20 is arranged between the flange 16 and the body flange of the valve.

Integral with the bonnet 8 is a yoke 21 consisting of spaced arms 22 each including sections A and B. The sections of each arm are detachably connected by bolts 23. Integral with the arms 22 is a bearing 24 composed of companion sections, each section being a part of an arm 22. The stem 6 extends through the bearing 24 and is provided with a keyway 25 to receive a key 26. The key splines to the stem below the bearing 24 an annular stop member 27 having integral therewith an extension 28 adapted to abut either of the yoke arms 22 for limiting the rotation of the valve element in either direction. This arrangement permits the valve stem and element to be rotated 90° in either direction.

A segmental gear 30 has a hub 31 which extends into the bearing 24 and is free to rotate relative thereto and has the stem 6 extending therethrough. The hub 31 is also capable of sliding in the bearing 24 and has formed therein a keyway 32 to receive the key 26. The size of the keyway 32 is such that any desired limited rotary movement up to 30° may be had between the stem 6 and the gear 30. The gear is of the worm type meshing with a worm 34 secured on a shaft 36. The shaft 36 is rotatably supported by a bracket 37 formed on one of the arms 22 and secured to said shaft is a hand wheel 38. The hub 31 of the gear is grooved and which groove opens outwardly through one side of the hub and provides shoulders 39 to fit within a groove 40 of a nut 41 threaded on the stem. The nut and gear are free to rotate relative to each other, however, the gear must slide with the nut when the latter is adjusted on the stem to compensate for wear. The rotation of the hand wheel 38 will rotate the gear 30 in either direction which in turn after a limited rotation will rotate the stem 6 and valve element in a corresponding direction.

Formed in the sections of the bearing 24 are cam grooves 42 engaged by pins 43 carried by the hub 31 of the gear 30. The shape of the cam groove is such that by rotation of the gear said gear will first impart to the valve element a limited sliding movement and then rotate said valve element and simultaneously slide said valve element in a reverse direction. The gear imparts said described movements to the valve element when rotated in either direction so that when the valve is to be opened the valve element is first moved in an endwise direction away from its seat and then simultaneously rotated and slid in a reverse direction to bring the passage 5 thereof in communication with the ports 2 and the valve element again into engagement with the seat 3. Consequently, it will be seen that when the valve element is either in open or closed position it will be tightly engaged with the seat to prevent leaks between the valve element and the body and further it will be seen that during each initial movement of the valve element either when moving to open or closed position it will receive endwise movement prior to its rotation and during the rotation will be slid in a reverse direction to engage the seat so as to assure against the valve element sticking to its seat when operated to open the valve and to become tightly engaged with said seat when assuming open position and vice versa when the valve is operated to become closed.

While the member 30 has been described as a worm gear operated by the worm through the rotation of a hand wheel 38 it is to be understood that the member 30 may have its teeth omitted and have formed upon some portion thereof handles for the purpose of rotating said member to actuate the valve.

What is claimed is:

1. A valve comprising a body formed with a duct therethrough, a tapered plug spanning the duct diametrically to divide the latter into intake and outlet ports, said plug being formed with a diametrical bore therethrough with its axis in the plane of the axis of said duct and being engaged in a tapered seat in the body, a stem extending axially from the plug, a bonnet closing the body above the plug and being formed with a yoke provided at its top with a bearing, a hub rotatably mounted in said bearing and disposed in surrounding relation to the valve stem and operatively connected with the latter to permit limited relative angular movement between itself and the stem, the bearing being formed on the interior surface with circumferential grooves having their intermediate portions in a plane at right angles to the axis of said stem and their extremities depressed angularly downward from said plane, the hub having oppositely disposed pins traversing said grooves, and a stop member surrounding the stem below the hub and provided with a radial extension abutting the arms of the yoke to limit angular or turning movement of the stem, the limited relative angular movement between the stem and hub being equal to the angular movement of the pins in traversing the depressed portions of the grooves.

2. A valve comprising a body formed with a duct therethrough, a tapered plug spanning the duct diametrically to divide the latter into intake and outlet ports, said plug being formed with a diametrical bore therethrough with its axis in the plane of the axis of said duct and being engaged in a tapered seat in the body, a stem extending axially from the plug, a bonnet closing the body above the plug and being formed with a yoke provided at its top with a bearing, a hub rotatably mounted in said bearing and disposed in surrounding relation to the valve stem and operatively connected with the latter to permit relative axial movement and limited relative angular movement between itself and the stem, adjustable means connecting the hub and stem to prevent relative axial movement therebetween, the bearing being formed on the interior surface with circumferential grooves having their intermediate portions in a plane at right angles to the axis of said stem and their extremities depressed angularly downward from said plane, the hub having oppositely disposed pins traversing said grooves, and a stop member surrounding the stem below the hub and provided with a radial extension abutting the arms of the yoke to limit angular or turning movement of the stem, the limited relative angular movement between the stem and hub being equal to the angular movement of the pins in traversing the depressed portions of the grooves.

FRANCIS T. REED.